(12) United States Patent
Schafer et al.

(10) Patent No.: US 7,889,086 B2
(45) Date of Patent: Feb. 15, 2011

(54) CAMERA ARRANGEMENT IN A MOTOR VEHICLE

(75) Inventors: Heiko Schafer, Erwitte (DE); Michael Schulte, Paderborn (DE)

(73) Assignee: Hella KgAA, Lippstadt (DE)

( * ) Notice: Subject to any disclaimer, the term of this patent is extended or adjusted under 35 U.S.C. 154(b) by 397 days.

(21) Appl. No.: 11/863,785

(22) Filed: Sep. 28, 2007

(65) Prior Publication Data

US 2009/0085755 A1   Apr. 2, 2009

(51) Int. Cl.
G08B 21/00 (2006.01)
(52) U.S. Cl. .................. 340/602; 340/604; 340/619; 340/620; 250/208.1; 348/148
(58) Field of Classification Search .......... 340/602, 340/603, 620, 435, 536, 438, 604, 619; 73/73; 205/208.1; 348/148
See application file for complete search history.

(56) References Cited

U.S. PATENT DOCUMENTS

| | | | | |
|---|---|---|---|---|
| 4,864,100 A | * | 9/1989 | Cicak | 219/203 |
| 6,313,454 B1 | * | 11/2001 | Bos et al. | 250/208.1 |
| 6,799,904 B2 | * | 10/2004 | Schaefer et al. | 396/427 |
| 6,824,281 B2 | * | 11/2004 | Schofield et al. | 359/876 |
| 7,208,962 B2 | * | 4/2007 | Sun et al. | 324/690 |
| 7,253,723 B2 | * | 8/2007 | Lindahl et al. | 340/438 |
| 7,492,270 B2 | * | 2/2009 | Veerasamy | 340/602 |
| 7,526,103 B2 | * | 4/2009 | Schofield et al. | 382/104 |
| 7,646,889 B2 | * | 1/2010 | Tsukamoto | 382/104 |

FOREIGN PATENT DOCUMENTS

DE    4329983 A1    9/1995

* cited by examiner

Primary Examiner—Davetta W Goins
(74) Attorney, Agent, or Firm—Robert C. Haldiman; Husch Blackwell LLP

(57) ABSTRACT

The invention presented herein is about a camera arrangement for a motor vehicle, comprised of a housing that can be attached on the inside of a windshield of a motor vehicle, at least one camera residing in the housing, a moisture sensor installation capable of detecting the moisture on the windshield, where the moisture sensor installation is a non-optical moisture sensor installation.

22 Claims, 1 Drawing Sheet

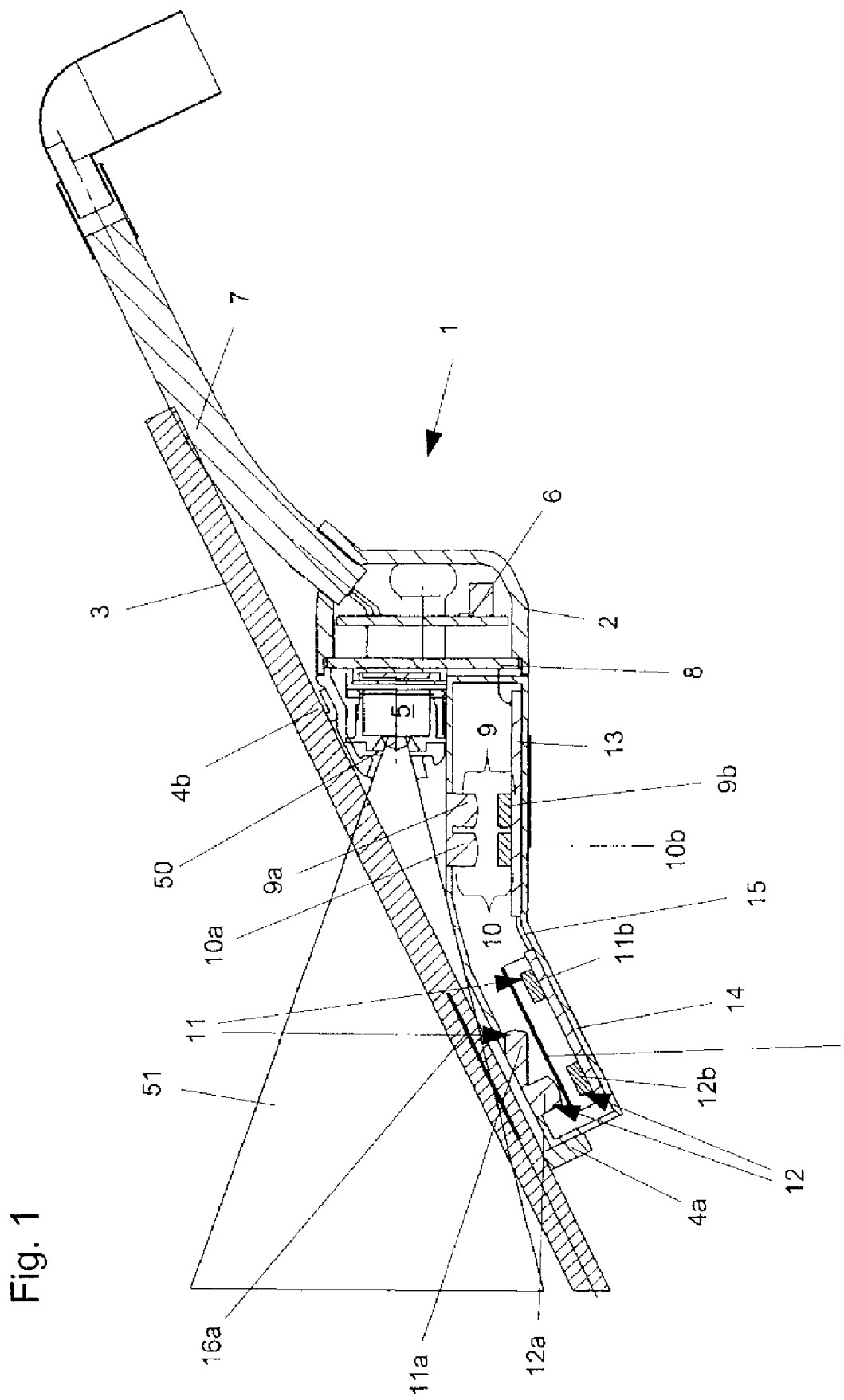

CAMERA ARRANGEMENT IN A MOTOR VEHICLE

FIELD OF THE INVENTION

The present invention is about a camera arrangement for a motor vehicle having a moisture sensor.

BACKGROUND OF THE INVENTION

Various designs of camera arrangements of the aforementioned type are known from the state of the art. DE 43 29 983 A1, for example, describes a camera arrangement installed in an overhead console. The camera arrangement features a camera for detecting the flow of traffic in a traveling direction and one or several sensor installations for receiving or transmitting optical and/or electromagnetic signals. Among other things, the camera arrangement includes an optical moisture sensor (rain sensor) mounted to the windshield of the motor vehicle to measure how the moisture on the outside of the windshield changes the reflection of a light beam. A disadvantage of this previously invented camera arrangement is that the optical moisture sensor requires an optical coupling with the inside of the windshield. This optical coupling is provided by suitable means of optical coupling such as transparent glue or a transparent gel pad. The ensuing disadvantage is that the means of optical coupling restricts the way of mounting the camera arrangement to a movement perpendicular to the windshield. The means of optical coupling quite constrains the mounting process because a mounting movement (pushing or turning) towards or on the windshield is impossible.

Another disadvantage of the previous camera arrangement is that, when the windshield is replaced, only some of the components of the camera arrangement can be reused because the other components are glued to the windshield.

The current invention has the task of providing a camera arrangement of the aforementioned type which can be easily mounted somewhere on the inside of the windshield of the motor vehicle.

SUMMARY OF THE INVENTION

The current invention accomplishes its objective by a camera arrangement having a novel mount and separately having a novel combination with a moisture sensor.

According to claim 1 hereof, the camera arrangement in conformity with the invention is marked by the moisture sensor installation being a non-optical moisture sensor installation. The benefit of the solution suggested herein is that, contrary to previous camera arrangements known from the state of the art, means of optical coupling need not be mounted and, specifically, glued in between the optical moisture sensor installation and the inside of the windshield. Surprisingly, integrating a camera and a non-optical moisture sensor installation in a camera arrangement substantially simplifies the mounting of the camera arrangement somewhere on the windshield of the motor vehicle because, among other things, it makes the mounting steps redundant otherwise required to provide an optical coupling between the windshield and the optical moisture sensor installation by means of a transparent gel pad or transparent glue.

Moreover, mounting can use pushing or turning movements or be performed in a snap-on action. Another advantage of the solution presented herein is that, since the camera arrangement is not glued to the windshield, it can be reused when the windshield is replaced.

A particularly beneficial design of the moisture sensor installation provides capacitive means of measuring the wetness on the outside and/or the inside of the windshield. This implement allows the reliable measurement of the damping of the outside of the windshield or the intensity of precipitation such that windshield wiper installations of the vehicle linked with the moisture sensor installation can be automatically turned on or off. Measuring the moisture on the inside of the windshield can help detect a steaming up of the windshield and, thus, turn on an air conditioning installation in the vehicle which will counteract the steaming up.

One depicted design suggests that the moisture sensor installation contains at least one conductor arrangement located in the windshield, at the windshield or at a distance away from the windshield, and at least one coil allocated to the at least one conductor arrangement.

The conductor arrangement could be a wire arrangement, for example. This will very efficiently provide and integrate a capacitive, non-optical moisture sensor installation in the camera arrangement with a coil acting as the inductive means of coupling.

One design provides an option of the camera arrangement containing some printed circuit boards with optoelectronic components located inside the housing. At least one of the printed circuit boards may host a control and/or analysis circuitry for the camera, for example. An alternative design would provide an option of installing a single printed circuit board with a certain amount of rigid circuit board components which interlink by flexible circuit board components. In this design, the rigid circuit board components would carry the optoelectronic components.

Another aspect of the design suggests that at least one of the printed circuit boards or, alternatively, one of the rigid circuit board components is mainly parallel with the windshield after installing the housing. The coil of the capacitive moisture sensor installation would be preferably placed on the printed circuit board/rigid circuit board component installed in parallel with the windshield.

To expand the functionality of the camera arrangement, another design may provide an option of the camera arrangement containing at least another optical and/or electromagnetic sensor installation. The at least one further optical and/or electromagnetic sensor installation would be integrated in the housing. This will save space and make the camera arrangement provide multiple sensor functions from a compact design.

In a beneficial design there is an option of at least one further sensor installation being a solar sensor installation capable of measuring the intensity of the sunlight. The solar sensor installation can be linked to the air conditioning system of the motor vehicle such that the air conditioning can be turned on or off depending on sunlight intensity.

In another beneficial design, the at least one further sensor installation can be an environment sensor installation capable of measuring the ambient light. Linking the environment sensor installation with a running light control of the motor vehicle allows the running light to be automatically turned on or off depending on the intensity of ambient light.

In another design there is an option of the at least one further sensor installation being a light sensor installation capable of measuring the brightness of the road surface. If this light sensor installation is connected to a so-called head-up display unit, it can be used to project (particularly vehicle-specific) information onto the windshield.

To improve the information displayed, the head-up display unit requires up-to-date information about the brightness of the road surface which the light sensor installation can provide.

In another beneficial design there is an option of the at least one further sensor installation being an ahead-area sensor installation set up to measure the illumination in an area immediately ahead of the motor vehicle.

A particularly beneficial design suggests that the camera arrangement has means of snapping the arrangement on to a rearview mirror of a motor vehicle. This means supports a comparatively easy mounting of the camera arrangement.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein further features and benefits of the invention are illustrated by the description of a preferred design example given below with reference to:

FIG. 1 attached hereto which shows a section through a camera arrangement of the current invention.

DETAILED DESCRIPTION OF THE PREFERRED EMBODIMENTS

The following description of the depicted embodiment(s) is merely exemplary in nature and is in no way intended to limit the invention, its application, or uses.

FIG. 1 shows a longitudinal section through a camera arrangement 1 representative of a preferred design example of the current invention. The camera arrangement 1 is comprised of a housing 2 which is attached to the inside of a windshield 3 of a motor vehicle by means of suitable fastening elements 4a, 4b.

In the housing 2 of the camera arrangement 1, there is a camera 5 with a 50 mm objective lens which can see the traffic situation ahead of the motor vehicle while the camera is in operation. FIG. 1 shows a schematic view of the viewing range 51 of the camera 5.

The housing 2 contains a first printed circuit board 6 holding optoelectronic components where, in this design example, the first printed circuit board 6 is mainly vertical after mounting the housing 2. FIG. 1 also shows a lead 7 with a connector and several electrical conductors which are electrically connected to the first printed circuit board 6. The housing 2 also contains a second printed circuit board 8 which is electrically connected to the first printed circuit board 6. FIG. 1 illustrates that the second printed circuit board 8 is mainly parallel with the first printed circuit board 6 and, thus, also mainly vertical.

The housing 2 also contains multiple sensor installations capable of transmitting and/or receiving optical and/or electromagnetic signals. In the design example illustrated in FIG. 1, the camera arrangement. 1 includes a solar sensor installation 9 comprised of a transparent optical element 9a located in a wall of the housing 2 and a receiver diode 9b allocated to the optical element 9a, where the receiver diode 9b is located on a third printed circuit board 13. FIG. 1 illustrates that the second printed circuit board 8 is mainly vertical and electrically connected with the third printed circuit board 13. The solar sensor installation 9 is capable of measuring the intensity of the sunlight that the windshield 3 is exposed to.

The solar sensor installation 9 can be linked to an air conditioning system of the motor vehicle such that, the air conditioning can be turned on or off depending on sunlight intensity.

The housing 2 also contains an environment sensor installation 10 comprised of a transparent optical clement 10a and a receiver diode 10b allocated to the optical clement 10a, where the receiver diode 10b also resides on the third printed circuit board 13. The environment sensor installation 10 is capable of measuring the ambient light. Coupling the environment sensor installation 10 of camera arrangement 1 with a running light control of the motor vehicle allows the running light to be automatically turned on or off depending on the intensity of illumination in the vicinity of the motor vehicle.

In this design example, the camera arrangement 1 also has a fourth printed circuit board 14 which is mainly parallel with the windshield 3 and connected to the third printed circuit hoard 13 by means of an elastic connection element 15. The sensor installations of the camera arrangement 1 include a light sensor installation 11 comprised of a transparent optical element 11a and a receiver diode 11b allocated to the optical clement 11a, where the receiver diode 11b also resides on the fourth printed circuit board 14. The light sensor installation 11 is designed such that it can measure the lighting situation and, specifically, the brightness of the road surface which are required to operate a so-called head-up display used to project information onto the windshield 3. In this design example, the sensor installations include an ahead-area sensor installation 12 comprised of a transparent optical element 12a and a receiver diode 12b allocated to the optical clement 12a, where the receiver diode 12b also resides on the fourth printed circuit board 14.

The camera arrangement 1 also comprises a non-optical moisture sensor installation 16 which, in this design example, is designed as a capacitive moisture sensor installation 16. The moisture sensor installation 16 has a conductor arrangement 16a which, in this design example, is located on the inside of the windshield 3. There are alternative options of locating the conductor arrangement 16a at the windshield 3 or some distance away from tire windshield 3. The conductor arrangement could be a wire arrangement, for example. The capacitive moisture sensor installation 16 also has a coil 16b which, in this design example, is located on the fourth printed circuit board 14. Using the conductor arrangement 16a as a resonating structure in conjunction with the coil 16b provides a means of capacitively measuring the wetness on the outside of the windshield 3 and of measuring the steaming up of the inside of the windshield 3 by computing the changes of a resonance vibration influenced by the amount of moisture. The amount of moisture measured on the inside of the windshield 3 can be used to turn on an air conditioning installation of the motor vehicle intended to counteract the steaming up. The amount of moisture measured on the outside of the windshield and the intensity of precipitation can be used to turn on a windshield wiper installation of the motor vehicle.

The camera arrangement 1 shown in the design example provides a combination of several separate functions as previously described herein.

A particular advantage of the camera arrangement 1 described herein is that major components of the capacitive moisture sensor installation 16 are immediately integrated in the camera arrangement 1. The camera arrangement 1 for motor vehicles provides multiple optical and/or electronic sensor installations integrated in the housing 2 to concentrate further functions of automatic running light control, sunlight sensors, steam-up sensor, and capacitive rain sensors in a single camera module. This integrated model has the advantage of reducing the costs of production and efforts of installation compared with those of previous camera arrangements. The camera arrangement 1 presented herein also consumes comparatively little space.

As various modifications could be made to the exemplary embodiments, as described above with reference to the corresponding illustrations, without departing from the scope of the invention, it is intended that all matter contained in the foregoing description and shown in the accompanying drawings shall he interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A camera arrangement in a motor vehicle comprised of:
a housing which can be mounted somewhere on the inside of a windshield of a motor vehicle;
at least one camera located in the housing;
a moisture sensor installation located in the housing capable of measuring the amount of wetness on the windshield;
wherein the moisture sensor installation is a non-optical moisture sensor installation;
wherein the camera arrangement features at least one further optical and/or electromagnetic sensor installation and the at least one further optical and/or electromagnetic sensor installation is integrated in the housing.

2. The camera arrangement as in claim 1, wherein the at least one further sensor installation is a solar sensor installation capable of measuring the intensity of sunlight.

3. The camera arrangement as in claim 1, wherein the at least one further sensor installation is an environment sensor installation capable of measuring the ambient light.

4. The camera arrangement as in claim 1, wherein the at least one further, sensor installation is a light sensor installation capable of measuring the brightness of the road surface.

5. The camera arrangement as in claim 1, wherein the at least one further sensor installation is an ahead-area sensor installation setup to measure the illumination in an area ahead of the motor vehicle.

6. The camera arrangement as in claim 1, wherein the camera arrangement is a module having an attachment member configured to attach to a rearview mirror of a motor vehicle.

7. The camera arrangement as in claim 6, wherein the attachment member is a snap fit.

8. The camera arrangement of claim 1 wherein said camera is externally oriented.

9. The camera arrangement of claim 1 wherein said conductor is disposed inside of a windshield on which said housing is mounted.

10. The camera arrangement of claim 1 wherein said housing may be mounted to an inside surface of a windshield without the use of transparent glue or a transparent gel pad.

11. The camera arrangement of claim 1 wherein said housing disposes both said camera and said nonoptical rain sensor substantially proximate an inside surface of the windshield.

12. A camera arrangement in a motor vehicle comprised of:
a housing which can be mounted somewhere on the inside of a windshield of a motor vehicle;
at least one camera located in the housing;
a moisture sensor installation located in the housing capable of measuring the amount of wetness on the windshield;
wherein the moisture sensor installation is a non-optical moisture sensor installation;
said camera comprising a lens and optoelectronic components on a first printed circuit board and said moisture sensor components on a second printed circuit board, each of said first and second printed circuit boards being at different angles relative to a windshield on which said housing is mounted.

13. The camera arrangement as in claim 12, wherein the camera arrangement is a module having an attachment member configured to attach to a rearview mirror of a motor vehicle.

14. A camera arrangement in a motor vehicle comprised of:
a housing which can be mounted somewhere on the inside of a windshield of a motor vehicle;
at least one camera located in the housing;
a moisture sensor installation located in the housing capable of measuring the amount of wetness on the windshield;
wherein the moisture sensor installation is a non-optical moisture sensor installation;
wherein a field of view of said camera is disposed to overlap a conductor arrangement of said nonoptical moisture sensor.

15. The camera arrangement as in claim 14, wherein the moisture sensor installation capacitively measures the wetness on the outside surface and/or the inside surface of the windshield.

16. The camera arrangement as in claim 14, wherein the moisture sensor installation includes at least one conductor arrangement located in the windshield, on the windshield or at some distance away from the windshield and at least one coil that is allocated to the at least one conductor arrangement.

17. The camera arrangement as in claim 1, wherein the camera arrangement includes a number of printed circuit boards carrying optoelectronic components and being located inside the housing.

18. The camera arrangement as in claim 12, wherein at least one of the printed circuit boards is substantially parallel with the windshield after installing the housing.

19. The camera arrangement as in claim 14, wherein the camera arrangement features at least one further optical and/or electromagnetic sensor installation.

20. The camera arrangement as in claim 14, wherein the camera arrangement is a module having an attachment member configured to attach to a rearview mirror of a motor vehicle.

21. A camera arrangement in a motor vehicle comprised of:
a housing which can be mounted somewhere on the inside of a windshield of a motor vehicle;
at least one camera located in the housing;
a moisture sensor installation located in the housing capable of measuring the amount of wetness on the windshield;
wherein the moisture sensor installation is a non-optical moisture sensor installation; and
an operative interface of said light sensor with a heads up display.

22. A camera arrangement in a motor vehicle comprised of:
a housing mountable on the inside of a windshield of a motor vehicle;
at least one camera located in said housing, said camera being externally oriented;
a moisture sensor located in said housing capable of measuring the amount of wetness on the windshield, the moisture sensor being a non-optical moisture sensor;

the moisture sensor being disposed to capacitively measure the wetness on a surface of the windshield with at least one conductor, said conductor being located at one of the inside of the windshield, on the windshield, or at some distance away from the windshield, and with at least one coil that is allocated to the at least one conductor;

a light sensor; and each of said camera, said moisture sensor and said light sensor being mounted on a printed circuit board within said housing.

* * * * *